United States Patent
Takanashi et al.

(10) Patent No.: US 10,775,523 B2
(45) Date of Patent: Sep. 15, 2020

(54) SURVEY METHOD, SEISMIC VIBRATOR, AND SURVEY SYSTEM

(71) Applicant: Japan Oil, Gas and Metals National Corporation, Minato-ku, Tokyo (JP)

(72) Inventors: Mamoru Takanashi, Tokyo (JP); Yuki Nakamura, Tokyo (JP); Yosuke Kunishi, Tokyo (JP)

(73) Assignee: JAPAN OIL, GAS AND METALS NATIONAL CORPORATION, Tokyo (JP)

( * ) Notice: Subject to any disclaimer, the term of this patent is extended or adjusted under 35 U.S.C. 154(b) by 328 days.

(21) Appl. No.: 15/730,702

(22) Filed: Oct. 11, 2017

(65) Prior Publication Data

US 2018/0045840 A1  Feb. 15, 2018

Related U.S. Application Data

(63) Continuation of application No. PCT/JP2015/062512, filed on Apr. 24, 2015.

(51) Int. Cl.
*G01V 1/30* (2006.01)
*G01V 1/00* (2006.01)
(Continued)

(52) U.S. Cl.
CPC ............... *G01V 1/30* (2013.01); *G01V 1/005* (2013.01); *G01V 1/375* (2013.01); *G01V 1/04* (2013.01);
(Continued)

(58) Field of Classification Search
CPC .......... G01V 1/005; G01V 1/30; G01V 1/003; G01V 2210/26; G01V 1/375
(Continued)

(56) References Cited

U.S. PATENT DOCUMENTS

| | | | | |
|---|---|---|---|---|
| 4,004,267 A | * | 1/1977 | Mayne | G01V 1/005 367/60 |
| 4,034,333 A | * | 7/1977 | Cunningham | G01V 1/04 367/46 |

(Continued)

FOREIGN PATENT DOCUMENTS

| | | |
|---|---|---|
| JP | 9-325003 A | 12/1997 |
| JP | 2004-163322 A | 6/2004 |

(Continued)

OTHER PUBLICATIONS

International Search Report in PCT/JP2015/062512, dated Jul. 28, 2015, 3pp.

(Continued)

*Primary Examiner* — Ian J Lobo
(74) *Attorney, Agent, or Firm* — Hauptman Ham, LLP

(57) ABSTRACT

A survey method includes generating a first amplitude modulation signal by amplitude-modulating a carrier wave repeating the same pattern at a predetermined cycle in each of a plurality of vibrators with a modulation signal whose cycle is 1/m times the predetermined period and is different for each of the vibrators, transmitting the seismic wave based on the first amplitude modulation signal, generating a second amplitude modulation signal in one or more receivers, the second amplitude modulation signal being identical to the first amplitude modulation signal generated by any one of the seismic vibrators, generating a reception signal in each of the one or more receivers by receiving a synthetic seismic wave in which the seismic waves generated by the seismic vibrators are synthesized, calculating a correlation value between the reception signal and the second amplitude modulation signal, and analyzing characteristics of the medium on the basis of the correlation value.

10 Claims, 10 Drawing Sheets

(51) Int. Cl.
*G01V 1/37* (2006.01)
*G01V 1/48* (2006.01)
*G01V 1/46* (2006.01)
*G01V 1/04* (2006.01)

(52) U.S. Cl.
CPC .................. *G01V 1/46* (2013.01); *G01V 1/48* (2013.01); *G01V 2210/1214* (2013.01); *G01V 2210/1295* (2013.01); *G01V 2210/26* (2013.01); *G01V 2210/614* (2013.01)

(58) Field of Classification Search
USPC ................................................ 367/40–42, 47
See application file for complete search history.

(56) References Cited

U.S. PATENT DOCUMENTS

| | | | | |
|---|---|---|---|---|
| 4,564,927 A | * | 1/1986 | Kolb | G01V 1/04 367/190 |
| 4,715,020 A | * | 12/1987 | Landrum, Jr. | G01V 1/003 367/38 |
| 4,969,129 A | * | 11/1990 | Currie | G01V 1/375 367/41 |
| 7,729,201 B2 | * | 6/2010 | Wildey | G01F 23/28 367/40 |
| 2009/0103595 A1 | | 4/2009 | Watanabe et al. | |

FOREIGN PATENT DOCUMENTS

| | | |
|---|---|---|
| JP | 2005-315741 A | 11/2005 |
| JP | 2009-68881 A | 4/2009 |

OTHER PUBLICATIONS

Written Opinion of the ISA in PCT/JP2015/062512, dated Jul. 28, 2015, 10pp.

\* cited by examiner (a)

(b)

SURVEY METHOD, SEISMIC VIBRATOR, AND SURVEY SYSTEM

CROSS-REFERENCE TO RELATED APPLICATIONS

The present application is a continuation application of International Application No. PCT/JP2015/062512, filed on Apr. 24, 2015. The contents of these applications are incorporated herein by reference in their entirety.

BACKGROUND OF THE INVENTION

In a ground survey and investigation of damage inside of an existing structure or the like, a non-destructive measurement for measuring the characteristics of a medium without destroying the medium to be surveyed is performed. Japanese Unexamined Patent Application Publication No. 2004-163322 discloses a method for measuring the characteristics of a medium by installing a plurality of seismic vibrators in contact with the medium, receiving signals transmitted from these seismic vibrators with a receiver, and analyzing the signals. In this method, each seismic vibrator transmits a seismic wave based on a pseudo random code signal of a different pattern, and so, in the receiver, a specific seismic wave is separated from a synthetic seismic wave in which the seismic waves transmitted from the plurality of seismic vibrators are synthesized.

In such a method, because the transmission energy of a seismic source is smaller than the seismic source such as dynamite, a process that is a so-called stack, which transmits and receives the same signal a plurality of times, is used in order to draw a distinction between random background noise and the signal from the seismic source. In such an application, a long measuring time is required, and so a technique for simultaneously outputting seismic waves from a plurality of seismic sources as disclosed in Patent Document 1 has the potential to streamline the operation.

In the conventional method, the receiver calculates a correlation value between i) a pseudo random code signal that is the same as the pseudo random code signal used by the seismic vibrator and ii) a reception signal based on a synthetic seismic wave in which seismic waves received from a plurality of seismic vibrators through a medium are synthesized, thereby specifying the component, which is included in the reception signal, of the seismic wave transmitted from the desired seismic vibrator. By utilizing the property that the cross-correlation value between pseudo random code signals of different patterns is smaller than the autocorrelation value between the same pseudo random code signals, the receiver can separate the reception signal corresponding to the seismic wave transmitted from the specific seismic vibrator from the received reception signal. The pseudo random code signal is a representation of the sign of the pseudo random code by the phase of the sine wave, and the sign 0 and the sign 1 of the pseudo random code are respectively represented by the sine wave of 0 to 360 degrees and the sine wave of −180 to 180 degrees.

However, it was found that distinguishing the pseudo random code signals by pattern could not be sufficiently performed when this technique was applied to the seismic survey. There are some conceivable reasons such as a fact that the cross-correlation value includes noise of about 2% to 3% of the peak value of the autocorrelation value. For this reason, when using such a technique, it is difficult to output the seismic waves simultaneously even when the plurality of seismic vibrators are prepared, and a long measurement time is required to receive the signals from all of the seismic vibrators, and so there is a problem that it is difficult to obtain a high S/N ratio.

BRIEF SUMMARY OF THE INVENTION

This invention focuses on these points, and the object of the invention is to improve the accuracy of a medium survey by using seismic wave transmitted simultaneously from a plurality of seismic vibrators and distinguishing a reception signal with high accuracy.

A survey method according to the first aspect of the present invention is a survey method for surveying a medium using a plurality of seismic vibrators that transmits seismic waves to the medium and one or more receivers that receive the plurality of seismic waves generated by the plurality of seismic vibrators, the survey method comprising the steps of generating a first amplitude modulation signal by amplitude-modulating a carrier wave repeating the same pattern at a predetermined cycle in each of the plurality of vibrators with a modulation signal whose cycle is 1/m times (m is a natural number) the predetermined cycle and is different for each of the vibrators, transmitting the seismic wave based on the first amplitude modulation signal, generating a second amplitude modulation signal in the one or more receivers, the second amplitude modulation signal being identical to the first amplitude modulation signal generated by any one of the plurality of the seismic vibrators, generating a reception signal in each of the one or more receivers by receiving a synthetic seismic wave in which the plurality of seismic waves generated by the plurality of seismic vibrators are synthesized, calculating a correlation value between the reception signal and the second amplitude modulation signal, and analyzing characteristics of the medium on the basis of the correlation value.

A seismic vibrator according to the second aspect of the present invention is a seismic vibrator for transmitting a seismic wave to a medium, the seismic vibrator includes a carrier wave generation part that generates a carrier wave repeating the same pattern at a predetermined cycle, a modulation signal generation part that generates a modulation signal having a cycle of 1/m times (m is a natural number) the predetermined cycle, a first modulation part that generates a first amplitude modulation signal obtained by amplitude-modulating the carrier wave with the modulation signal, and a seismic wave generation part that generates the seismic wave on the basis of the first amplitude modulation signal.

A survey system according to the third aspect of the present invention is a survey system including a plurality of seismic vibrators that transmits seismic waves to a medium, one or more receivers that receive a synthetic seismic wave in which the plurality of seismic waves generated by the plurality of seismic vibrators are synthesized, through the medium, and a signal analyzing apparatus that analyzes a reception signal based on the synthetic seismic wave received by the one or more receivers, wherein each of the plurality of the seismic vibrators includes a first carrier wave generation part that generates a first carrier wave repeating the same pattern at a predetermined cycle, a first modulation signal generation part that generates a first modulation signal having a cycle of 1/m times (m is a natural number) the predetermined cycle, a first modulation part that generates a first amplitude modulation signal obtained by amplitude-modulating the first carrier wave with the first modulation signal, a second carrier wave generation part that generates a second carrier wave identical to the first carrier wave generated by the first carrier wave generation part, a second modulation signal generation part that generates one or more second modulation signals identical to at least one of the first modulation signals generated by the first modulation signal generation parts of the plurality of seismic vibrators, a second modulation part that generates one or more second amplitude modulation signals obtained by amplitude-modulating the second carrier wave with the one or more second modulation signals, a calculation part that calculates a correlation value between the reception signal and the one or more second amplitude modulation signals, and an analyzing part that analyzes characteristics of the medium on the basis of the correlation value calculated by the calculation part.

DETAILED DESCRIPTION OF THE INVENTION

Hereinafter, the present invention will be described through exemplary embodiments of the present invention, but the following exemplary embodiments do not limit the invention according to the claims, and not all of the combinations of features described in the exemplary embodiments are necessarily essential to the means to solve the problem.

Figure 1:
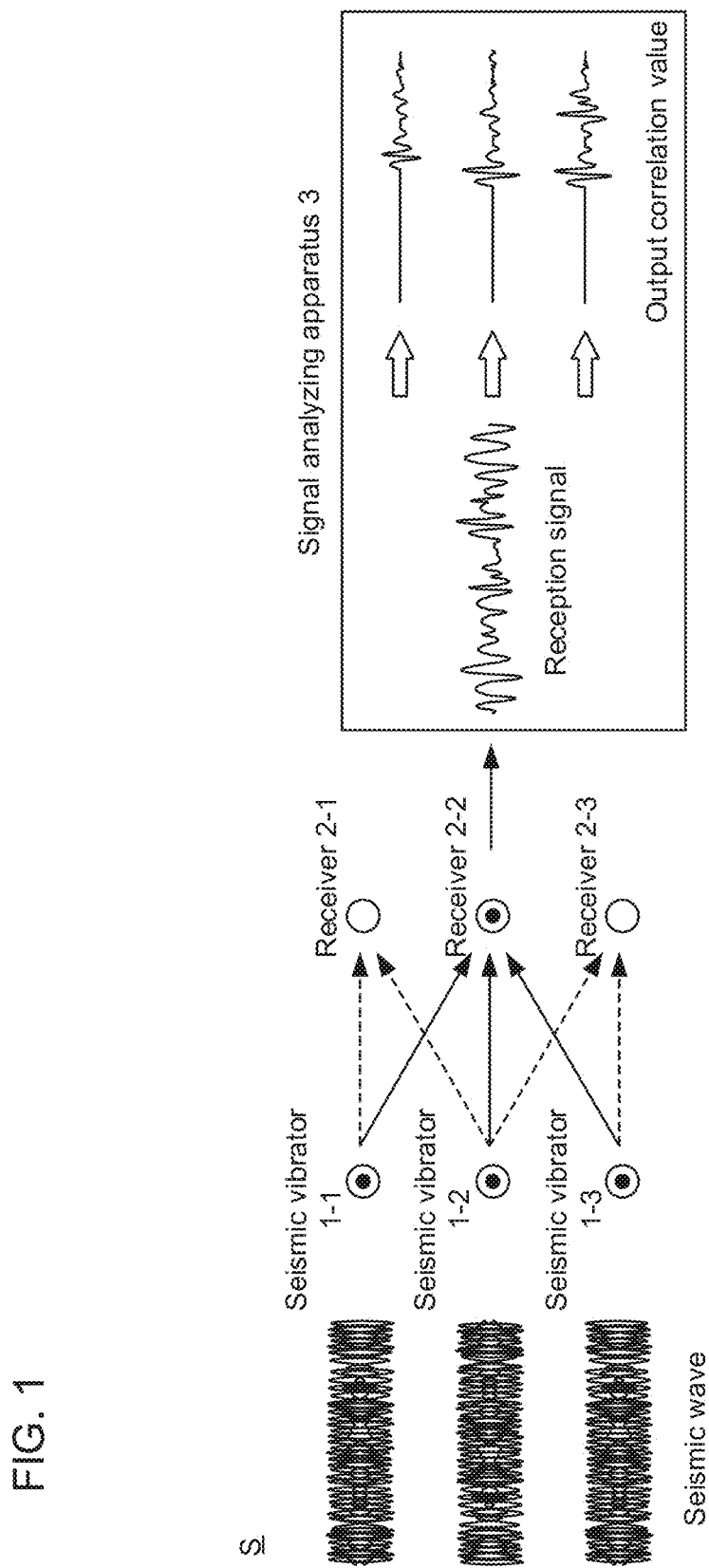
FIG. 1 is a diagram for describing an outline of a survey system.

FIG. 1 is a diagram for describing an outline of a survey system S according to one exemplary embodiment of the present invention. The survey system S includes a plurality of seismic vibrators 1 (a seismic vibrator 1-1 to a seismic vibrator 1-3) and a plurality of receivers 2 (a receiver 2-1 to a receiver 2-3). The plurality of seismic vibrators 1 amplitude-modulates a carrier wave with modulation signals of different frequencies to generate an amplitude modulation signal, and transmits a seismic wave, which causes a medium to vibrate, into the medium on the basis of the generated amplitude modulation signal. In the carrier wave, the same pattern is repeated at a predetermined cycle. The cycle of the modulation signal is 1/m times (m is a natural number) the cycle of the repetitive pattern included in the carrier wave, and a different m is allocated to each of the seismic vibrators 1.

The carrier wave is obtained by repeating a periodic signal of the same pattern of a predetermined cycle L times (L is a natural number). A signal that represents a sign of the pseudo random code by the phase of the sine wave, or a so-called SWEEP wave signal for continuously changing the frequency of the sine wave within a predetermined time period, exemplifies the periodic signal. It should be noted that the relationship between m and L is preferably 2L>m, and by setting L to be an odd number, the maximum numbers of modulation waves can be added within a predetermined period.

The plurality of receivers 2 receives the seismic wave transmitted through the medium. The receiver 2 receives the synthetic seismic wave in which a plurality of seismic waves generated with shocks from the plurality of seismic vibrators 1 are synthesized, and generates a reception signal corresponding to the received synthetic seismic wave. The reception signal is analyzed in a signal analyzing apparatus 3 (for example, a computer).

The signal analyzing apparatus 3 calculates a cross-correlation value between i) the reception signal inputted from each of the plurality of receivers 2 and ii) the amplitude modulation signal corresponding to the seismic wave transmitted by each of the plurality of seismic vibrators 1. By calculating the cross-correlation value, the signal analyzing apparatus 3 separates the component based on the seismic wave transmitted by the specific seismic vibrator 1 from the reception signal based on the seismic wave received by each of the plurality of receivers 2, thereby specifying the characteristics of the medium between each of the plurality of seismic vibrators 1 and the receivers 2. Specifically, the signal analyzing apparatus 3 can specify the characteristics of the medium between the specific seismic vibrator 1 and the receiver 2 by specifying the timing at which the calculated correlation value peaks and the magnitude of the correlation value.

The seismic wave is amplitude-modulated with the modulation signal having a cycle of 1/m times the cycle of the repetitive pattern of the carrier wave that is different for each of the seismic vibrators 1. Therefore, when the signal analyzing apparatus 3 analyzes the characteristics of the medium on the basis of the seismic wave transmitted by the seismic vibrator 1-1, the cross-correlation value with the seismic wave transmitted by, for example, the seismic vibrator 1-2 becomes 0 due to the positive value and the negative value canceling each other. As a result, the feature of the survey system S of the present exemplary embodiment is that it is not affected by the seismic waves transmitted by the other seismic vibrators 1 when the signal analyzing apparatus 3 analyzes the characteristics of the medium on the basis of the seismic wave transmitted by the seismic vibrator 1-1.

Figure 2:
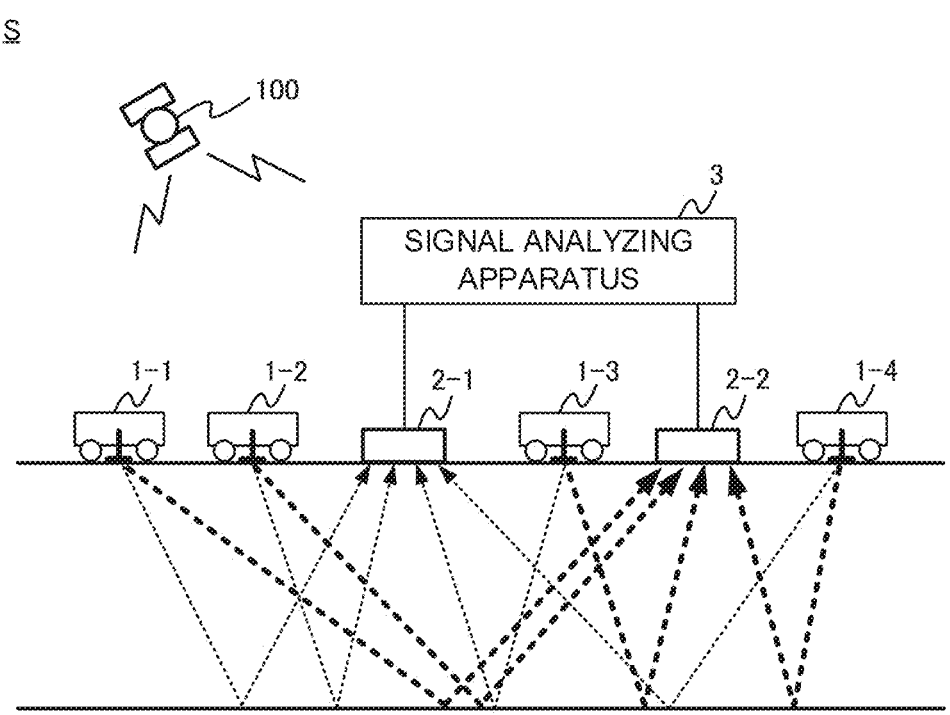
FIG. 2 is a diagram showing an arrangement example of seismic vibrators and receivers in the survey system.

FIG. 2 is a diagram showing an arrangement example of the seismic vibrators 1 and the receivers 2 in the survey system S. In FIG. 2, the plurality of seismic vibrators 1 (the seismic vibrator 1-1 to the seismic vibrator 1-3) and the plurality of receivers 2 (the receiver 2-1 to the receiver 2-3) are shown. The seismic waves transmitted by the respective seismic vibrators 1 propagate through the ground, which is an example of the medium, and are reflected and scattered according to the characteristics of substances in the ground, and then reach the receiver 2.

The receiver 2-1 and the receiver 2-2 are connected to the signal analyzing apparatus 3 via a cable or a radio line, and signals based on the seismic waves, which are respectively received by them, are sent to the signal analyzing apparatus 3. The signal analyzing apparatus 3 analyzes the signals received from the receiver 2-1 and the receiver 2-2 to specify the characteristics of the geological features.

Figure 3:
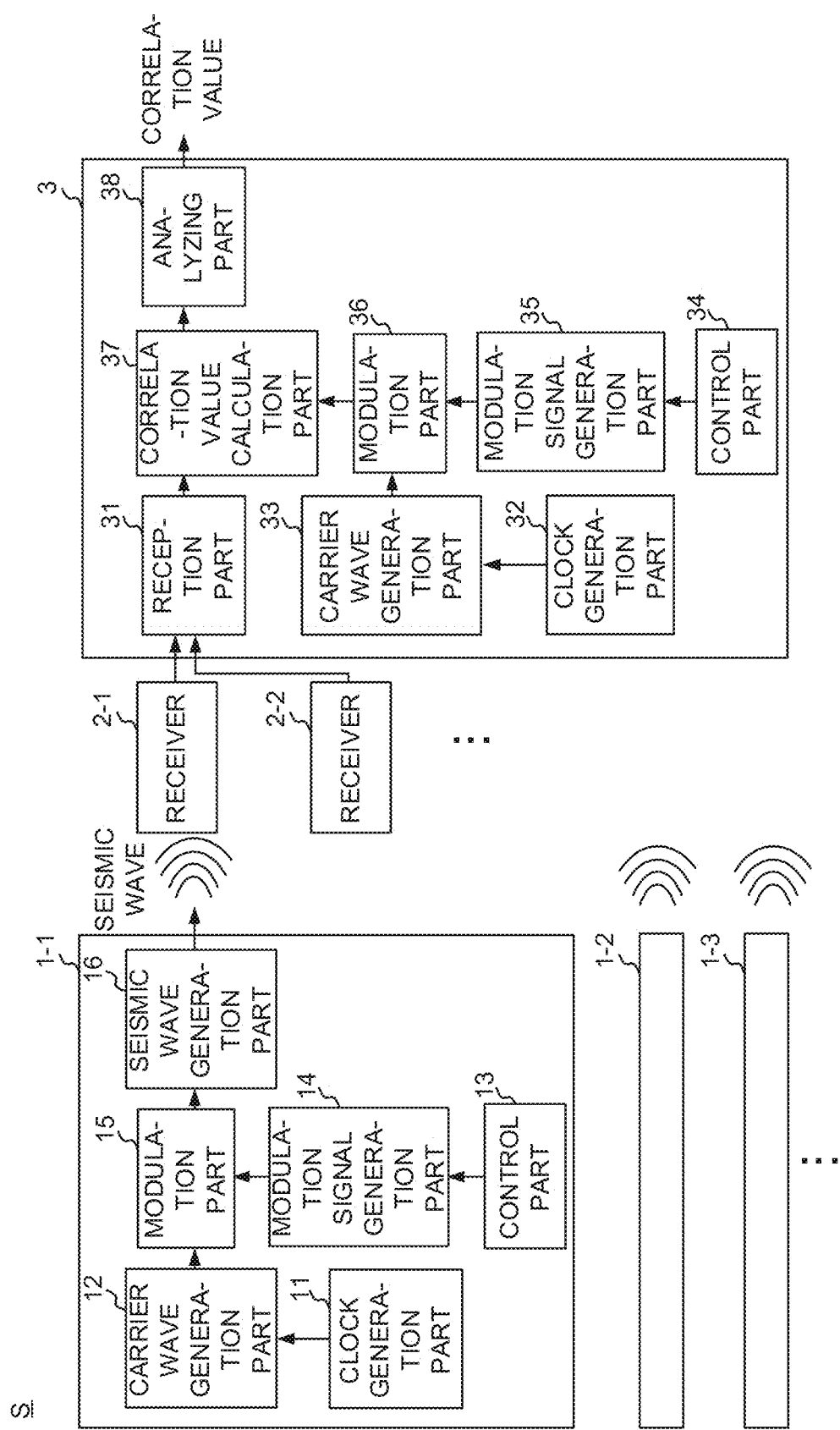
FIG. 3 is a diagram showing a configuration of the survey system.

FIG. 3 is a diagram showing a configuration of the survey system S. The seismic vibrator 1 includes a clock generation part 11, a carrier wave generation part 12, a control part 13, a modulation signal generation part 14, a modulation part 15, and a seismic wave generation part 16. The seismic vibrator 1 is, for example, the Vibroseis. The Vibroseis is a kind of seismic source used in the oil exploration method and is an apparatus that gives a waveform whose frequency varies with time on the ground surface.

The clock generation part 11 generates a clock on the basis of radio waves received from a Global Positioning System (GPS) satellite. The clock generation part 11 outputs the generated clock to the carrier wave generation part 12. Because the clock generated by the clock generation part 11 is synchronized with the radio waves received from the GPS satellite, all of the seismic vibrators 1 of the survey system S operate synchronously.

The carrier wave generation part 12 generates the carrier wave repeating the same pattern at a predetermined cycle on the basis of the clock inputted from the clock generation part 11. The carrier wave generation part 12 generates the carrier wave by using, for example, a random number composed of a pseudo random code such as an M-sequence whose length for one cycle is $N=2^{n-1}$. Specifically, the carrier wave generation part 12 generates a pseudo random wave based on the pseudo random code whose length for one cycle is $N=2^{n-1}$ (n is a natural number) by inverting the phase of a single frequency according to a random number, and then generates a carrier wave by repeating the generated pseudo random wave. The autocorrelation function of the M-sequence code is 1 at lag time 0, and the autocorrelation function of the M-sequence code is −1/N when the lag time is not 0.

By using the carrier wave that repeats the same pattern, the S/N can be improved by overlapping the received seismic waves in the receiver 2. For example, in the receiver 2, the S/N becomes √100 times by overlapping 100 patterns.

Here, the length for one cycle of the same pattern is set to be longer than a propagation delay time of the seismic wave from the seismic vibrator 1 to the receiver 2. In this way, in the signal analyzing apparatus 3, by using the correlation characteristics of the pseudo random wave, it becomes possible to separate the seismic wave transmitted by the specific seismic vibrator 1 from the synthetic seismic wave in which the seismic waves transmitted by the plurality of seismic vibrators 1 are synthesized.

Figure 4A:
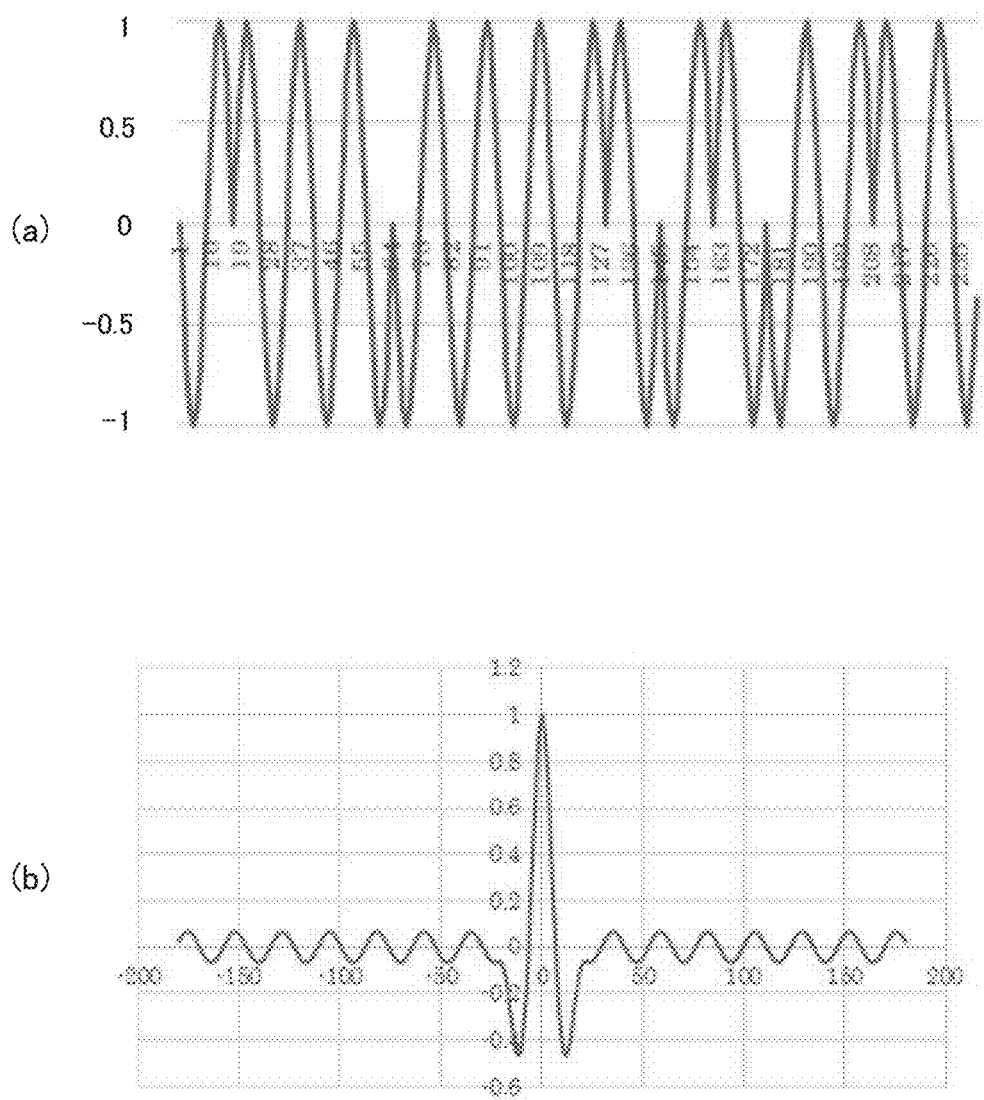
FIG. 4A is a diagram for describing a carrier wave generated by a carrier wave generation part.
Figure 4B:
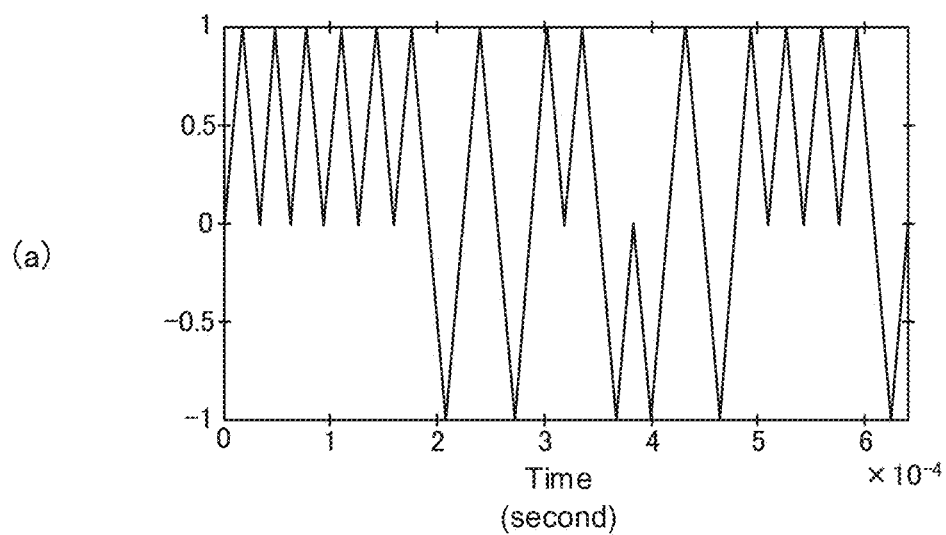
FIG. 4B is a diagram for describing a carrier wave generated by a carrier wave generation part.
Figure 4B:
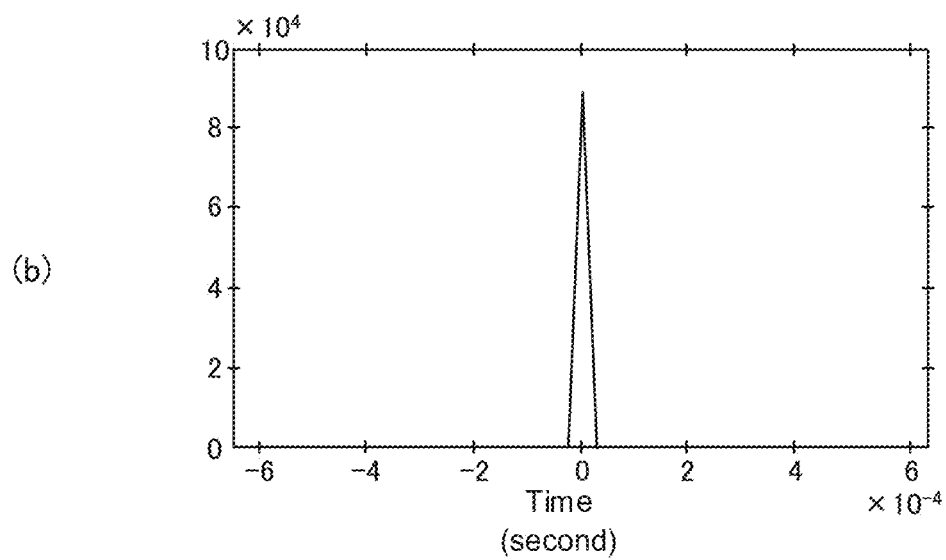

FIG. 4 is a diagram for describing the carrier wave generated by the carrier wave generation part 12. FIG. 4A (a) is an example of the pseudo random wave generated on the basis of the pseudo random code generated in the carrier wave generation part 12. This pseudo random wave is an example of a pseudo random wave in which the sign 0 is represented by sin(θ) and the sign 1 is expressed by sin(180°+θ) (where 0≤θ<360°) for a pattern (100011110101100) that is an example of a 15-bit M-sequence pseudo random code.

As shown in FIG. 4A (a), the phases are randomly inverted in the pseudo random wave generated by the carrier wave generation part 12. FIG. 4A (b) is an autocorrelation function of the carrier wave shown in FIG. 4A (a). The horizontal axis represents the lag time, and the vertical axis represents the correlation value. As shown in FIG. 4A (b), a sharp peak appears at the lag time 0.

FIG. 4B (a) represents the sign of the pseudo random code in the direction of the amplitude. FIG. 4B (b) is an autocorrelation function when a 4095-bit pseudo random code is expressed by this method, in which case a sharper peak appears.

Returning to FIG. 3, the control part 13 includes, for example, a CPU and a memory. The control part 13 controls the frequency of the modulation signal generated by the modulation signal generation part 14. For example, the control part 13 receives an input operation of a set value from the outside and controls the modulation signal generation part 14 so as to generate a modulation signal with a frequency based on the inputted set value.

The modulation signal generation part 14 generates the modulation signal on the basis of the control of the control part 13. The modulation signal is a signal used for modulating the carrier wave generated by the carrier wave generation part 12 and is a sine wave having a frequency lower than the frequency of the carrier wave. The modulation signal generation part 14 determines the frequency or cycle of the modulation signal on the basis of the set value inputted from the control part 13. In the survey system S, the modulation signal generation part 14 in each of the seismic vibrators 1 is adjusted so as to generate the modulation signals with different frequencies, and the modulation signal is 1/m times the cycle of the repetitive pattern in the carrier wave as described above.

The modulation part 15 generates the amplitude modulation signal by amplitude-modulating the carrier wave inputted from the carrier wave generation part 12 on the basis of the modulation signal inputted from the modulation signal generation part 14. In the survey system S, the modulation part 15 in each of the seismic vibrators 1 generates the amplitude modulation signal whose amplitude changes at mutually different cycles. The seismic wave generation part 16 vibrates in synchronization with the amplitude modulation signal generated by the modulation part 15 to transmit the seismic wave in the ground.

Figure 5:
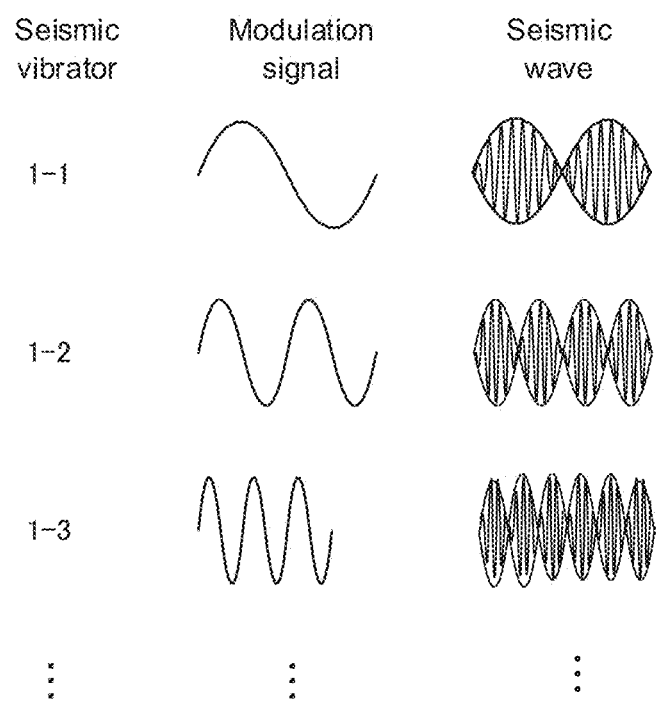
FIG. 5 is a diagram schematically showing a modulation signal and a seismic wave.

FIG. 5 is a diagram schematically showing the modulation signal generated by the modulation signal generation part 14 in the seismic vibrators 1-1, 1-2, and 1-3, and the seismic wave transmitted from the seismic wave generation part 16 in each of the seismic vibrators. As shown in FIG. 5, when the frequency of the modulation signal of the clock generation part 11 is F1, the frequency F2 of the modulation signal of the carrier wave generation part 12 is F2=2×F1, and the frequency F3 of the modulation signal of the control part 13 is F3=3×F1. The frequency Fm of the modulation signal of the seismic vibrator m (m is a natural number) is expressed by Fm=m×F1.

Figure 6:
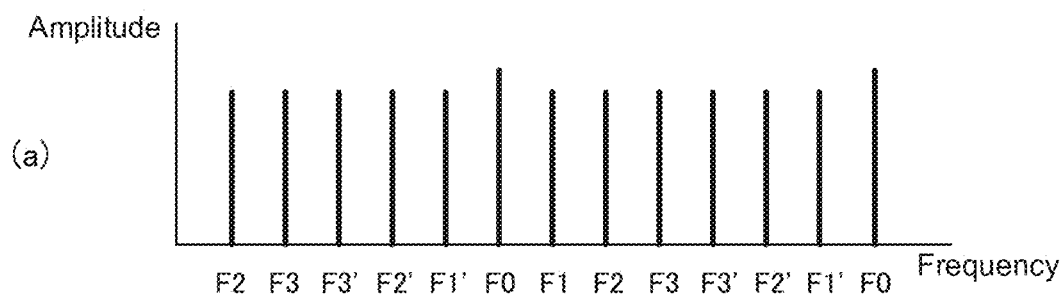
FIG. 6 is a diagram showing a frequency spectrum of a seismic wave.
Figure 6:
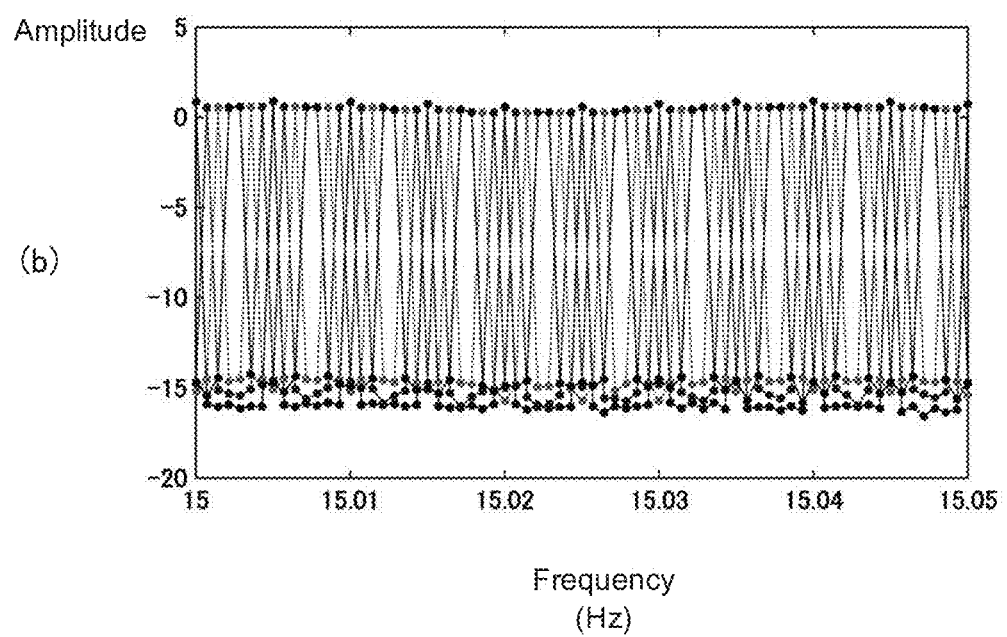

The carrier wave is generated by repeating the above-mentioned pseudo random wave L times. FIG. 6 is a diagram showing a frequency spectrum of the seismic wave generated by amplitude-modulating the carrier wave, which is generated by repeating the pseudo random wave based on a 4095-bit M-sequence pseudo random code seven times, with three kinds of modulation signals. FIG. 6 (a) shows an actual measurement example of the frequency spectrums of the seismic waves generated by amplitude-modulating with the three kinds of modulation signals having the frequencies F1, F2=2×F1, and F3=3×F1. FIG. 6 (b) shows an actual measurement example of the frequency spectrums of the seismic waves generated by amplitude-modulating with the three kinds of modulation signals having the frequencies F1, F2=2×F1, and F3=3×F1. In this way, it can be seen that each of the seismic waves can be separated from the others even when they are simultaneously transmitted to the ground.

As shown in FIG. 6, the spectrums that are repeated every seven channels appear in the frequency domain. The three kinds of spectrums of the modulated seismic waves are included in two channels separated by $\pm m/T = \pm m\Delta F$ from the spectrum of the seismic wave that is not amplitude-modulated according to each modulation cycle.

Here, m=1, 2, and 3 is the modulation cycle, T is the total time length of the waveform repeated seven times, and $\Delta F$ is the frequency increment after the discrete Fourier transform. When the number of repetitions of the pseudo random wave is seven, seven spectrums consisting of i) the spectrum of the seismic wave that is not amplitude-modulated and ii) two spectrums of each of the three kinds of amplitude-modulated seismic waves are repeated. By increasing the number of repetitions of the pseudo random wave, it is possible to use more seismic waves.

Returning to FIG. 3, the seismic wave transmitted by the seismic wave generation part 16 propagates through the ground and reaches the receivers 2 (the receiver 2-1 and the receiver 2-2 in FIG. 3). The receiver 2-1 and the receiver 2-2 receive the synthetic seismic wave in which the seismic waves transmitted by the plurality of seismic vibrators 1 are synthesized. The receiver 2-1 and the receiver 2-2 transmit reception signals (for example, electric signals) based on the received synthetic seismic waves to the signal analyzing apparatus 3.

The signal analyzing apparatus 3 includes a reception part 31, a clock generation part 32, a carrier wave generation part 33, a control part 34, a modulation signal generation part 35, a modulation part 36, a correlation value calculation part 37, and an analyzing part 38. The reception part 31 receives the reception signals generated by the receivers 2. The reception part 31 outputs the reception signal received from each of the receivers 2 to the correlation value calculation part 37.

The clock generation part 32 has a function equivalent to that of the clock generation part 11, and generates a clock on the basis of the radio wave received from the GPS satellite. The clock generation part 32 outputs the generated clock to the carrier wave generation part 33. The carrier wave generation part 33 has a function equivalent to that of the carrier wave generation part 12, and generates the same carrier wave as the carrier wave generated by the carrier wave generation part 12 on the basis of the clock inputted from the clock generation part 32.

The control part 34 has a function equivalent to that of the control part 13, and includes, for example, a CPU and a memory. The control part 34 receives an input operation of a set value from the outside and controls the modulation signal generation part 35 so as to generate a modulation signal with a frequency based on the inputted set value. The control part 34 controls the modulation signal generation part 35 so as to, for example, generate the modulation signal having the same frequency as the frequency of the modulation signal used by the seismic vibrator 1 that transmits the seismic wave propagated through the underground portion to be analyzed.

The modulation signal generation part 35 generates one or more modulation signals identical to at least one of the modulation signals generated by the modulation signal generation parts 14 of the plurality of seismic vibrators 1. The modulation part 36 generates one or more amplitude modulation signals by amplitude-modulating the carrier wave inputted from the carrier wave generation part 33 by using the modulation signal inputted from the modulation signal generation part 35. The modulation part 36 outputs the generated one or more amplitude modulation signals to the correlation value calculation part 37. The modulation part 36 may generate one amplitude modulation signal by performing amplitude modulation using one modulation signal selected by the control part 34 among one or more modulation signals generated by the modulation signal generation part 35.

The correlation value calculation part 37 calculates a correlation value between the reception signal inputted from the reception part 31 and the amplitude modulation signal selected by the control part 34 among one or more amplitude modulation signals inputted from the modulation part 36. The cross-correlation function is expressed by the following expression (1).

$$R(\tau) = \sum_t x_t \overline{y}_{t-\tau} = \sum_t x_t \overline{x}_{t-\tau} \qquad (1)$$

In the expression (1), $x_t$ is the discrete data of the reception signal based on the seismic wave transmitted by the seismic vibrator 1 to be analyzed, $y_t$ is the discrete data of the amplitude modulation signal, $\tau$ is the lag time, and t is the time sample. As described above, in calculating the cross-correlation value, it is not affected by the seismic wave transmitted by a seismic vibrator 1 other than the seismic vibrator 1 to be analyzed. Therefore, the amplitude modulation signal in the present exemplary embodiment is considered to be the signal similar to the reception signal, and calculating the cross-correlation value between the reception signal and the amplitude modulation signal is equivalent to calculating the autocorrelation value of the reception signal.

Since the amplitude modulation signal is a signal multiplied by a cosine in accordance with the modulation cycle, the autocorrelation function is expressed by the expression (2).

$$R'(\tau, m) = \sum_t x_t \cos\left(\frac{2\pi m t}{T}\right) \overline{x_{t-\tau} \cos\left(\frac{2\pi m (t-\tau)}{T}\right)} \qquad (2)$$

In the expression (2), T is the time length of the modulation signal.

Here, when $x_t = x_{kt'}$ (where k is the number of repetitions of the same pattern), based on the multiplication and addition of k cosines for each sample t', the autocorrelation waveform that is modulated with the integer m (m≠k/2, 0<m<k) is expressed by the expression (3) regardless of m.

$$R'(\tau, m) = \frac{1}{2} R(\tau) \ (\tau \ll T) \qquad (3)$$

The analyzing part 38 analyzes the underground characteristics between the seismic vibrator 1 that transmitted the seismic wave whose correlation value was calculated, and the receiver 2 that outputted the reception signal corresponding to the seismic wave on the basis of the correlation value calculated by the correlation value calculation part 37 as described above. Specifically, the analyzing part 38 can specify the propagation delay time on the basis of the lag time at which the calculated correlation value becomes the maximum, and can specify the attenuation characteristic according to the magnitude of the correlation value.

(Variation)

In the above description, the carrier wave is a pseudo random wave with a constant amplitude, but the carrier wave generation part 12 and the carrier wave generation part 33 may generate a carrier wave on the basis of a sweep signal whose amplitude changes with the passage of time. The carrier wave generated on the basis of the sweep signal whose amplitude changes with the passage of time is advantageous when the propagation delay time between the seismic vibrator 1 and the receiver 2 is large.

Figure 7:
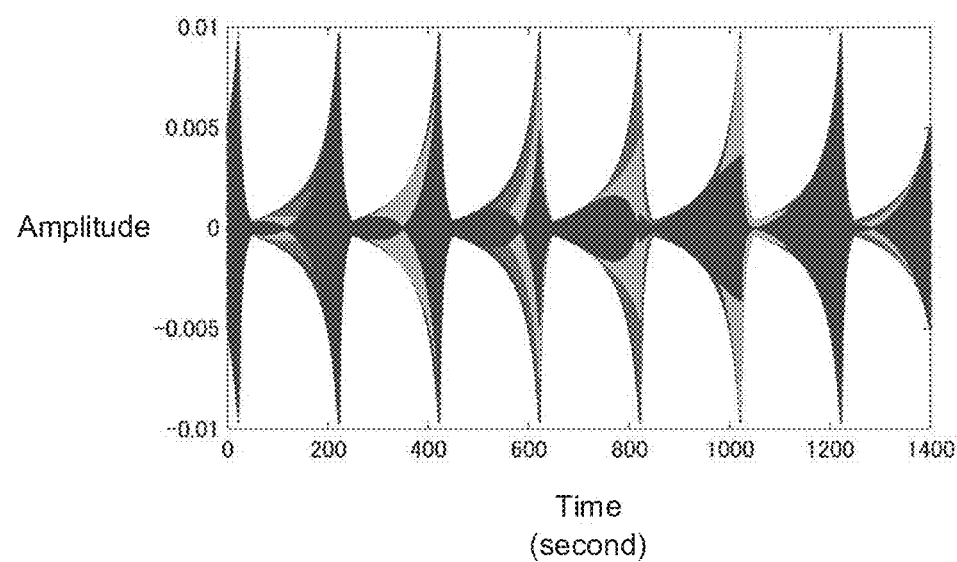
FIG. 7 is a diagram showing a waveform of an amplitude modulation signal generated by amplitude-modulating a carrier wave based on a sweep signal with a modulation signal.

FIG. 7 is a diagram showing a waveform of an amplitude modulation signal generated by amplitude-modulating a carrier wave based on a sweep signal with a modulation signal. In FIG. 7, different colors are shown according to the frequency of the modulation signal.

Experimental Example

Figure 8:
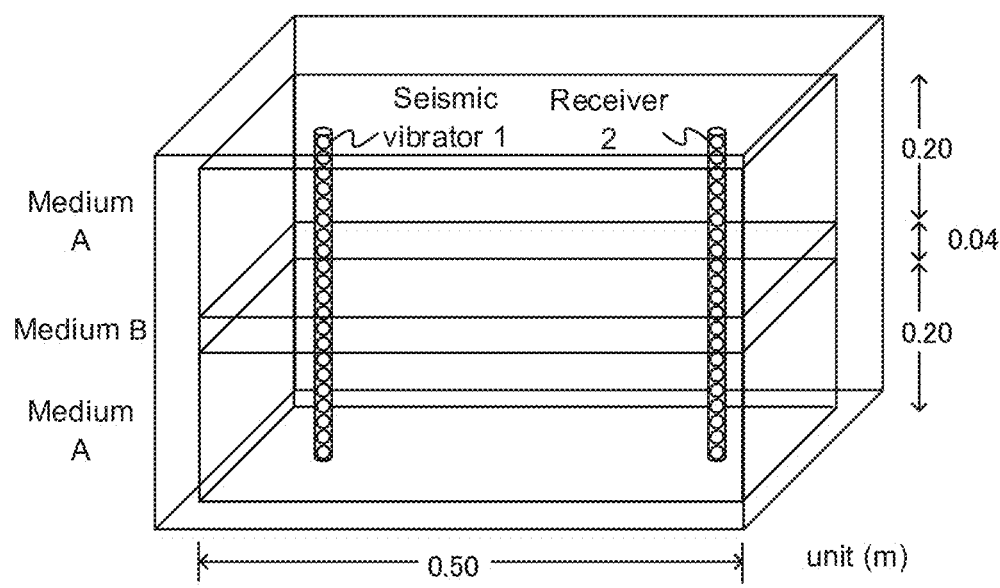
FIG. 8 is a schematic diagram of an experimental system T that transmits seismic waves from a plurality of seismic vibrators and receives seismic waves with a plurality of receivers.

FIG. 8 is a schematic diagram of an experimental system T that transmits the seismic wave from the plurality of seismic vibrators 1 and receives the seismic wave with the plurality of receivers 2. In the experiment, two through-holes were provided so as to penetrate the layered product consisting of a medium A and a medium B with different sound speeds, and 20 seismic vibrators 1 consisting of piezo elements were installed on one side and 20 receivers were installed on the other side in a state where the system is filled with water. Five vibrators were arbitrarily selected from among the seismic vibrators 1 and were set so as to be able to supply amplitude modulation signals that were modulated with different modulation signals respectively. It should be noted that, in FIG. 8, the seismic vibrators 1 and the receivers 2 are indicated by circles.

Five kinds of amplitude modulation signals were respectively transmitted from the selected plurality of seismic vibrators 1, and the reception signal based on the synthetic seismic wave in which the seismic waves received by the 20 receivers 2 were synthesized was analyzed with a computer. It should be noted that, in the experimental example, the 4095-bit pseudo random code was generated as a pseudo random wave with a 78-kHz sine wave by using the same modulation method as in FIG. 4A (a), a carrier wave repeating this pseudo random wave 11 times was generated, and an amplitude modulation signal generated by adding a sine wave that divides the carrier wave into 1, 2, 3, 4, or 5 portions (0.578, 1.155, 1.733, 2.310, or 2.888 Hz, respectively) was used.

Figure 9:
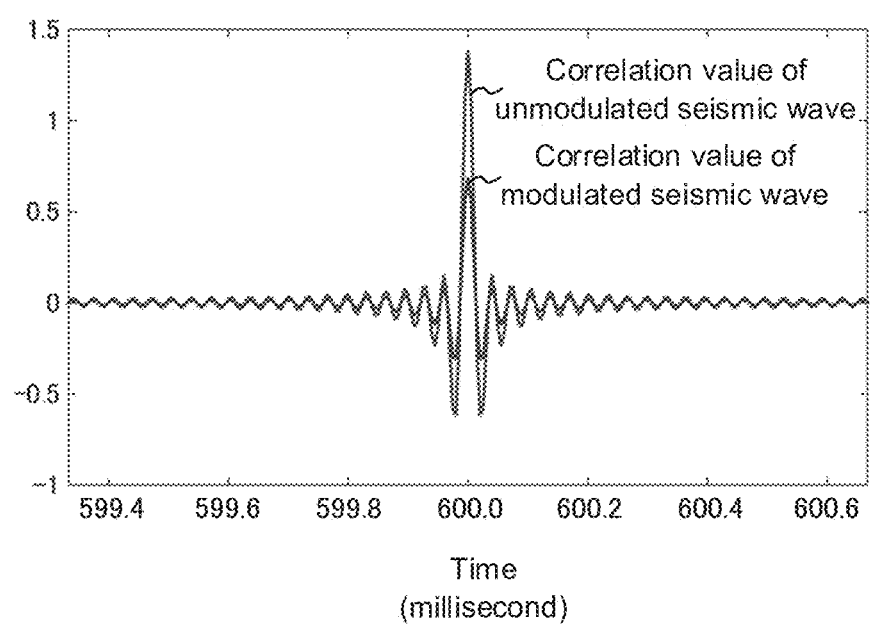
FIG. 9 is a diagram showing an example of a result of calculating a correlation value for a seismic wave received by a receiver.

FIG. 9 is a diagram showing an example of a result of calculating the correlation value for the synthetic seismic wave received by one of the plurality of receivers 2. In FIG. 9, the correlation value of the unmodulated seismic wave is half of the amplitude of the correlation value of the modulated seismic wave. The lag time corresponding to the peak of the correlation value is 600 milliseconds.

In this way, by calculating and analyzing the correlation value based on the seismic wave transmitted from each of the plurality of seismic vibrators 1, it was possible to obtain an acoustic tomographic image reflecting the difference in sound velocity between the medium A and the medium B. It should be noted that, in this experimental example, the method of analyzing the state of the medium between the seismic vibrator and the receiver with the carrier wave by the pseudo random wave was described, but when the pseudo random wave is a sweep waveform, the method can be applied to a seismic survey using reflected waves from the underground interfacial boundary and others as shown in FIG. 2, and can also be applied to underwater environments or the like.

The present invention is explained with the exemplary embodiments of the present invention but the technical scope of the present invention is not limited to the scope described in the above embodiment. It is apparent for those skilled in the art that it is possible to make various changes and modifications to the embodiment. It is apparent from the description of the scope of the claims that the forms added with such changes and modifications are included in the technical scope of the present invention.

What is claimed is:

1. A survey method for surveying a medium using a plurality of seismic vibrators that transmit a plurality of seismic waves to the medium and one or more receivers that receive the plurality of seismic waves generated by the plurality of seismic vibrators, and a signal analyzing apparatus, the survey method comprising the steps of:
generating, in each of the plurality of seismic vibrators that each operates in synchronization, a first amplitude modulation signal by amplitude-modulating a carrier wave that repeats the same pattern at a predetermined cycle with a modulation signal whose cycle is 1/m times (m is a natural number) the predetermined cycle, the first amplitude modulation signal being different for each of the plurality of seismic vibrators;
transmitting a seismic wave based on the first amplitude modulation signal from each of the plurality of seismic vibrators;
generating a reception signal, in each of the one or more receivers, based on a received synthesized seismic wave in which the plurality of seismic waves generated by the plurality of seismic vibrators are synthesized;
generating a second amplitude modulation signal in the signal analyzing apparatus, the second amplitude modulation signal being identical to the first amplitude modulation signal generated by any one of the plurality of the seismic vibrators;
calculating a correlation value between the synthesized seismic wave and the second amplitude modulation signal in the signal analyzing apparatus; and
analyzing characteristics of the medium on the basis of the correlation value in the signal analyzing apparatus.

2. The survey method according to claim 1, wherein the transmitting the seismic wave includes the step of:
generating the carrier wave on the basis of a pseudo random code.

3. The survey method according to claim 1, wherein the transmitting the seismic wave includes the step of:
generating the carrier wave on the basis of a sweep signal whose amplitude changes with the passage of time.

4. The survey method according to claim 1, wherein the predetermined cycle is longer than a propagation delay time from the seismic vibrator to the receiver.

5. The survey method according to claim 1, wherein the analyzing characteristics of the medium includes the steps of:
separating the component based on the seismic wave transmitted by the specific seismic vibrator from the reception signal; and
specifying the characteristics of the medium between the specific seismic vibrator and the receiver.

6. The survey method according to claim 1, wherein the analyzing characteristics of the medium includes the step of:

specifying the timing at which the correlation value peaks and the magnitude of the correlation value.

7. A survey system comprising:
a plurality of seismic vibrators that transmit a plurality of seismic waves to a medium;
one or more receivers that receive a synthesized seismic wave in which the plurality of seismic waves generated by the plurality of seismic vibrators are synthesized, via the medium; and
a signal analyzing apparatus that analyzes a reception signal based on the synthesized seismic wave received by the one or more receivers, wherein
each of the plurality of seismic vibrators that operates synchronously includes:
   a first carrier wave generation part that generates a first carrier wave repeating the same pattern at a predetermined cycle;
   a first modulation signal generation part that generates a first modulation signal having a cycle of 1/m times (m is a natural number) the predetermined cycle;
   a first modulation part that generates a first amplitude modulation signal obtained by amplitude-modulating the first carrier wave with the first modulation signal; and
   a seismic wave generation part that generates a seismic wave on the basis of the first amplitude modulation signal, and wherein
the signal analyzing apparatus includes:
   a second carrier wave generation part that generates a second carrier wave identical to the first carrier wave generated by the first carrier wave generation part;
   a second modulation signal generation part that generates one or more second modulation signals identical to at least one of the first modulation signals generated by the first modulation signal generation parts of the plurality of seismic vibrators;
   a second modulation part that generates one or more second amplitude modulation signals obtained by amplitude-modulating the second carrier wave with the one or more second modulation signals;
   a calculation part that calculates a correlation value between the synthesized seismic wave and the one or more second amplitude modulation signals; and
   an analyzing part that analyzes characteristics of the medium on the basis of the correlation value calculated by the calculation part.

8. The survey system according to claim 7, wherein
the second modulation part generates a plurality of second amplitude modulation signals having different cycles,
the signal analyzing apparatus includes a control part that selects the one or more second amplitude modulation signals from the plurality of second amplitude modulation signals generated by the second modulation part, and
the calculation part calculates a correlation value between the synthesized seismic wave and the one or more second amplitude modulation signals selected by the control part.

9. The survey system according to claim 7, wherein
the signal analyzing apparatus can specify the characteristics of the medium between the specific seismic vibrator and the receiver by separating the component based on the seismic wave transmitted by the specific seismic vibrator from the reception signal.

10. The survey system according to claim 7, wherein
the signal analyzing apparatus can specify the characteristics of the medium between the specific seismic vibrator and the receiver by specifying the timing at which the correlation value peaks and the magnitude of the correlation value.

* * * * *